(12) United States Patent
Al-Gouhi et al.

(10) Patent No.: US 10,590,752 B2
(45) Date of Patent: Mar. 17, 2020

(54) AUTOMATED PREVENTIVE AND PREDICTIVE MAINTENANCE OF DOWNHOLE VALVES

(71) Applicant: Saudi Arabian Oil Company, Dhahran (SA)

(72) Inventors: Al-Waleed A. Al-Gouhi, Dhahran (SA); Soloman M. Almadi, Dhahran (SA); Obiomalotaoso L. Isichei, Rakkah (SA)

(73) Assignee: Saudi Arabian Oil Company, Dhahran (SA)

( * ) Notice: Subject to any disclaimer, the term of this patent is extended or adjusted under 35 U.S.C. 154(b) by 257 days.

(21) Appl. No.: 15/181,005

(22) Filed: Jun. 13, 2016

(65) Prior Publication Data

US 2017/0356283 A1    Dec. 14, 2017

(51) Int. Cl.

| | | |
|---|---|---|
| *E21B 47/00* | (2012.01) | |
| *F16K 37/00* | (2006.01) | |
| *G05B 23/02* | (2006.01) | |
| *E21B 34/06* | (2006.01) | |
| *E21B 41/00* | (2006.01) | |

(52) U.S. Cl.
CPC .............. *E21B 47/00* (2013.01); *E21B 34/06* (2013.01); *E21B 41/00* (2013.01); *F16K 37/0075* (2013.01); *G05B 23/0283* (2013.01)

(58) Field of Classification Search
CPC .......... E21B 47/00; E21B 41/00; E21B 34/06; G05B 23/0283; F16K 37/0075; G01M 99/00; G06Q 10/20; Y10T 137/8158
See application file for complete search history.

(56) References Cited

U.S. PATENT DOCUMENTS

| | | |
|---|---|---|
| 4,757,314 A | 7/1988 | Aubin |
| 5,975,204 A | 11/1999 | Tubel et al. |

(Continued)

FOREIGN PATENT DOCUMENTS

CN    203322437    12/2013

OTHER PUBLICATIONS

Storey, "Building a Maintenance Management Program for Valves," Control Engineering, Web page, Apr. 17, 2014; 4 pages <http://www.controleng.com/industry-news/single-article/building-a-maintenance-management-program-for-valves/20afd59f11c5dec4ec222cc79937e40b.html>.

(Continued)

*Primary Examiner* — George S Gray
(74) *Attorney, Agent, or Firm* — Fish & Richardson P.C.

(57) ABSTRACT

A method of automated preventive and predictive maintenance for downhole valves in a well system includes receiving, at a plurality of first times, first diagnostics data of the plurality of downhole valves, where each downhole valve is at a respective first valve position at a respective first time, and the diagnostics data represents a valve condition of each downhole valve at a respective valve position and at a respective time. The method also includes receiving, at a plurality of second times, second diagnostics data of the plurality of downhole valves, where each downhole valve has been moved from the respective first valve position at the respective first time to a respective second valve position at a respective second time. The first diagnostics data and the second diagnostics data are compared. Based on results of comparing, a valve maintenance operation is selected for each downhole valve.

21 Claims, 4 Drawing Sheets

(56) References Cited

U.S. PATENT DOCUMENTS

| | | | |
|---|---|---|---|
| 6,046,685 A * | 4/2000 | Tubel | E21B 23/03 |
| | | | 137/606 |
| 6,356,844 B2 | 3/2002 | Thomas et al. | |
| 7,259,688 B2 | 8/2007 | Hirsch et al. | |
| 7,478,024 B2 | 1/2009 | Gurpinar et al. | |
| 7,584,165 B2 | 9/2009 | Buchan | |
| 7,828,065 B2 * | 11/2010 | Ross | E21B 34/10 |
| | | | 166/373 |
| 8,280,635 B2 | 10/2012 | Ella et al. | |
| 8,761,911 B1 | 6/2014 | Chapman et al. | |
| 2006/0086497 A1 | 4/2006 | Ohmer et al. | |
| 2007/0198223 A1 * | 8/2007 | Ella | G06Q 10/06 |
| | | | 702/188 |
| 2008/0251260 A1 | 10/2008 | Ross et al. | |
| 2013/0151020 A1 | 6/2013 | Manninen et al. | |
| 2014/0261791 A1 * | 9/2014 | Grabau | F16K 37/0075 |
| | | | 137/551 |
| 2016/0123111 A1 * | 5/2016 | Kim | E21B 34/08 |
| | | | 166/53 |
| 2017/0284191 A1 * | 10/2017 | Martin | E21B 47/12 |

OTHER PUBLICATIONS

Banks, "Take Control: Smart Valves Step Forward," (XP055401051), Offshore-Technology.com, Jun. 18, 2008; 6 pages, <http://www.offshore-technology.com/features/feature2034/>.

Husain et al., "Quantifying the Intelligent Field Added Values," (SPE 167439) Oct. 30, 2013; 9 pages, <https://www.onepetro.org/download/conference-paper/SPE-167439-MS?id=conference-paper/SPE-167439-MS>.

International Search Report and Written Opinion issued in International Application No. PCT/US2017/035603 dated Aug. 31, 2017; 12 pages.

Gulf Cooperation Council Examination Report issued in GCC Application No. GC 2017-33548 dated Jan. 22, 2019, 4 pages.

* cited by examiner

AUTOMATED PREVENTIVE AND PREDICTIVE MAINTENANCE OF DOWNHOLE VALVES

TECHNICAL FIELD

This disclosure relates to maintenance of downhole valves in a well system.

BACKGROUND

Downhole valves are widely used in well systems to control flows of well fluid through wellbores. However, several factors such as scale buildup, erosion or corrosion in wells may deteriorate valves and affect valve performance. For example, moving parts of a valve may become hard to move or non-movable if the valve remains at the same position for a long period of time. Therefore, maintenance operations such as valve repair or replacement are needed to prevent valve failures and extend lifetime. Manually scheduling maintenance operations by an operator can be inefficient and ineffective, especially if downhole valve conditions are unknown or there are a large number of valves in a well system.

SUMMARY

This disclosure relates to automated preventive and predictive maintenance of downhole valves.

In some aspects, a computer-implemented method is in a well system including a plurality of downhole valves. Each downhole valve is positioned below a surface and in a wellbore included in the well system. Each downhole valve controls flow of well fluid through the wellbore. The computer-implemented method includes receiving, at a plurality of first times and by one or more processors, first diagnostics data of the plurality of downhole valves, where each downhole valve is at a respective first valve position at a respective first time, and the diagnostics data represents a valve condition of each downhole valve at a respective valve position and at a respective time; receiving, at a plurality of second times and by the one or more processors, second diagnostics data of the plurality of downhole valves, where each downhole valve has been moved from the respective first valve position at the respective first time to a respective second valve position at a respective second time; comparing, by the one or more processors; the first diagnostics data and the second diagnostics data; and based on results of comparing the first diagnostics data and the second diagnostics data; selecting, by the one or more processors, a valve maintenance operation for each downhole valve.

This, and other aspects, can include one or more of the following features. The method can also include receiving, at a plurality of third times and by one or more processors, third diagnostics data of the plurality of downhole valves, where each downhole valve is at the respective first valve position at a respective third time; receiving, at a plurality of fourth times and by the one or more processors, fourth diagnostics data of the plurality of downhole valves, where each downhole valve has been moved from the respective first valve position at the respective third time to the respective second valve position at a respective fourth time; comparing, by the one or more processors, the first diagnostics data and the third diagnostics data; comparing, by the one or more processors, the second diagnostics data and the fourth diagnostics data; and based on results of comparing the first diagnostics data and the third diagnostics data and comparing the second diagnostics data and the fourth diagnostics data, scheduling, by the one or more processors, a second valve maintenance operation for each downhole valve at a respective future time. Each downhole valve can be sequentially moved from the respective first valve position to the respective second valve position. After collecting the second diagnostics data at each downhole valve at each respective second valve position, each downhole valve can be returned to the respective first valve position. The plurality of downhole valves can be choke valves. The diagnostics data can include at least one of valve attribute data, well production attribute data, or fault detection attribute data. The valve attribute data can include at least one of valve position or line pressure. The valve position can include at least one of open or closed position. The line pressure can include a well fluid pressure in a flow path controlled by the valve, or a fluid flow rate through the valve. The well production attribute data can include at least one of well head pressure at the surface of the well system or well fluid production rate through the wellbore. The fault detection attribute data can indicate at least one of leakage in a valve actuator, looseness in a valve assembly, or a hydraulic failure in the valve. Comparing the first diagnostics data to the second diagnostics data can include performing a correlation operation on the first diagnostics data and the second diagnostics data. The valve maintenance operation can be at least one of replacing the valve, stopping flow of well fluid through the valve, repairing the valve, or capturing the diagnostic data. For each downhole valve, the respective first valve position, the respective first time, the respective second valve position, and the respective second time can be stored. An alert based on the results of comparing the first diagnostics data and the second diagnostics data can be provided. The well system can be a multilateral well comprising a mother wellbore and multiple lateral wellbores, the mother wellbore and each lateral wellbore comprising at least one of the plurality of downhole valves. A respective reliability for each downhole valve can be determined based on the results of comparing the first diagnostics data and the third diagnostics data and comparing the second diagnostics data and the fourth diagnostics data, where the reliability indicates a probability that the valve would fail during a predetermined duration of time. The respective future time for the second valve maintenance operation for each downhole valve can be determined based on the respective reliability. For each downhole valve the respective third time is three months from the respective first time, and the respective fourth time is three months from the respective second time.

In some aspects, a non-transitory, computer-readable medium stores one or more instructions executable by a computer system to perform operations in a well system including a plurality of downhole valves. Each downhole valve is positioned below a surface and in a wellbore included in the well system. Each downhole valve controls flow of well fluid through the wellbore. The operations include receiving, at a plurality of first times, first diagnostics data of the plurality of downhole valves, where each downhole valve is at a respective first valve position at a respective first time, and the diagnostics data represents a valve condition of each downhole valve, at a respective valve position and at a respective time; receiving, at a plurality of second times, second diagnostics data of the plurality of downhole valves, where each downhole valve has been moved from the respective first valve position, at the respective first time, to a respective second valve position, at a respective second time; comparing the first diagnostics data and the second diagnostics data; and based on results of comparing the first diagnostics data and the second diagnostics data, selecting a valve maintenance operation for each downhole valve.

This, and other aspects, can include one or more of the following features. The operations can also include receiving, at a plurality of third times; third diagnostics data of the plurality of downhole valves, where each downhole valve is at the respective first valve position at a respective third time; receiving, at a plurality of fourth times, fourth diagnostics data of the plurality of downhole valves, where each downhole valve has been moved from the respective first valve position at the respective third time to the respective second valve position at a respective fourth time; comparing the first diagnostics data and the third diagnostics data; comparing the second diagnostics data and the fourth diagnostics data; and based on results of comparing the first diagnostics data and the third diagnostics data and comparing the second diagnostics data and the fourth diagnostics data, scheduling a second valve maintenance operation for each downhole valve at a respective future time. The diagnostics data can include at least one of valve attribute data, well production attribute data, or fault detection attribute data. The valve attribute data can include at least one of valve position or line pressure. The valve position can include at least one of open or closed position. The line pressure can include a well fluid pressure in a flow path controlled by the valve, or a fluid flow rate through the valve. The well production attribute data can include at least one of well head pressure at the surface of the well system or well fluid production rate through the wellbore. The fault detection attribute data can indicate at least one of leakage in a valve actuator, looseness in a valve assembly, or a hydraulic failure in the valve. A respective reliability for each downhole valve can be determined based on the results of comparing the first diagnostics data and the third diagnostics data and comparing the second diagnostics data and the fourth diagnostics data, where the reliability indicates a probability that the valve would fail during a predetermined duration of time. The respective future time for the second valve maintenance operation for each downhole valve can be determined based on the respective reliability.

In some aspects; a system includes a computer memory and a hardware processor. The hardware processor is interoperably coupled with the computer memory and configured to perform operations in a well system including a plurality of downhole valves. Each downhole valve is positioned below a surface and in a wellbore included in the well system. Each downhole valve controls flow of well fluid through the wellbore. The operations include receiving, at a plurality of first times and by one or more processors, first diagnostics data of the plurality of downhole valves, where each downhole valve is at a respective first valve position at a respective first time, and the diagnostics data represents a valve condition of each downhole valve at a respective valve position and at a respective time; receiving, at a plurality of second times and by the one or more processors, second diagnostics data of the plurality of downhole valves, where each downhole valve has been moved from the respective first valve position at the respective first time to a respective second valve position at a respective second time; comparing, by the one or more processors, the first diagnostics data and the second diagnostics data; and based on results of comparing the first diagnostics data and the second diagnostics data, selecting, by the one or more processors, a valve maintenance operation for each downhole valve.

This, and other aspects, can include one or more of the following features. The operations also include receiving, at a plurality of third times and by one or more processors, third diagnostics data of the plurality of downhole valves, where each downhole valve is at the respective first valve position at a respective third time; receiving, at a plurality of fourth times and by the one or more processors, fourth diagnostics data of the plurality of downhole valves, where each downhole valve has been moved from the respective first valve position at the respective third time to the respective second valve position at a respective fourth time; comparing, by the one or more processors, the first diagnostics data and the third diagnostics data; comparing, by the one or more processors, the second diagnostics data and the fourth diagnostics data; and based on results of comparing the first diagnostics data and the third diagnostics data and comparing the second diagnostics data and the fourth diagnostics data, scheduling, by the one or more processors, a second valve maintenance operation for each downhole valve at a respective future time. The system can also include multiple sensors disposed at multiple locations in the wellbore. The diagnostics data can be determined based on information sensed by the multiple sensors. The diagnostics data can include at least one of valve attribute data, well production attribute data, or fault detection attribute data. The valve attribute data can include at least one of valve position or line pressure. The valve position can include at least one of open or closed position. The line pressure can include a well fluid pressure in a flow path controlled by the valve, or a fluid flow rate through the valve. The well production attribute data can include at least one of well head pressure at the surface of the well system or well fluid production rate through the wellbore. The fault detection attribute data can indicate at least one of leakage in a valve actuator, looseness in a valve assembly, or a hydraulic failure in the valve. A respective reliability for each downhole valve can be determined based on the results of comparing the first diagnostics data and the third diagnostics data and comparing the second diagnostics data and the fourth diagnostics data, where the reliability indicates a probability that the valve would fail during a predetermined duration of time. The respective future time for the second valve maintenance operation for each downhole valve can be determined based on the respective reliability.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Sub-surface downhole valves can be used to control flows of well fluid in wellbores. For example, downhole valves can be used in oil, gas, or injection wells. In some cases, a multilateral well can be drilled such that hydrocarbons in multiple zones of interest can be produced from a single well system. The multilateral well can include a mother wellbore and a number of lateral wellbores that are drilled from the mother wellbore. To control flows of well fluid from the lateral wellbores to the mother wellbore, as well as the fluid flow from the mother wellbore, downhole valves can be used in the lateral wellbores and the mother wellbore.

This disclosure describes automated preventive and predictive maintenance for downhole valves, in some implementations, sensors are disposed in downhole valves and at multiple locations in wellbores to measure valve conditions and well conditions. As described in this disclosure, an automated preventive and predictive maintenance to downhole valves (APPMDV) system integrating sensors can perform diagnostic analysis for the valves using diagnostic data based on sensor measurements. Based on the diagnostic analysis, the APPMDV system can schedule and perform preventive and predictive maintenance operations for the valves. The maintenance operations can be operations such as replacing the valve, repairing the valve, stopping flow of well fluid through the valve, determining that no valve operation need be performed, collecting diagnostic data or other maintenance operations. In some implementations, the APPMDV system can move a valve to different valve positions (for example, open and closed positions) and capture corresponding diagnostic data. By comparing diagnostic data at different valve positions, the APPMDV system can diagnose if the valve has an abnormal condition and select a maintenance operation (for example, a valve repair, replacement or other maintenance operation) to prevent a valve failure. If no abnormal condition is diagnosed, the APPMDV system can determine not to perform any maintenance operation. In some implementations, the APPMDV system can periodically capture diagnostic data based on a pre-determined maintenance cycle (for example, every three months or other maintenance cycle duration). By comparing diagnostic data from a current cycle and a previous cycle, the APPMDV system can predict a remaining lifetime of the valve and adjust a frequency of capturing diagnostic data. For example, if a valve has a short remaining lifetime (that is, the valve is starting to wear), diagnostic data may need to be captured more frequently so that a fault or abnormal condition can be detected early, that is, before a significant repair or replacement operation becomes necessary. In some implementations, when a fault or an abnormal condition of the valve is detected, an impact and severity of the fault or abnormal condition can be predicted, and a valve replacement or repair can be scheduled and performed based on the predicted impact and severity.

In sum, the described approach provides a platform to perform diagnostic analysis for downhole valves and automatically schedule and perform proactive maintenance based on the analysis. For example, if a valve is beginning to wear, a reduced maintenance cycle duration can be automatically configured so that the valve can be more frequently monitored to prevent a valve failure. The proactive maintenance can increase valve reliability and lifetime. The automated maintenance scheduling can increase operational efficiency and reduces effort of manual scheduling by an operator. Moreover, the automated maintenance scheduling capability enables workflow system integration, performance monitoring and reporting at both site level and field level, and even enterprise level.

Figure 1:
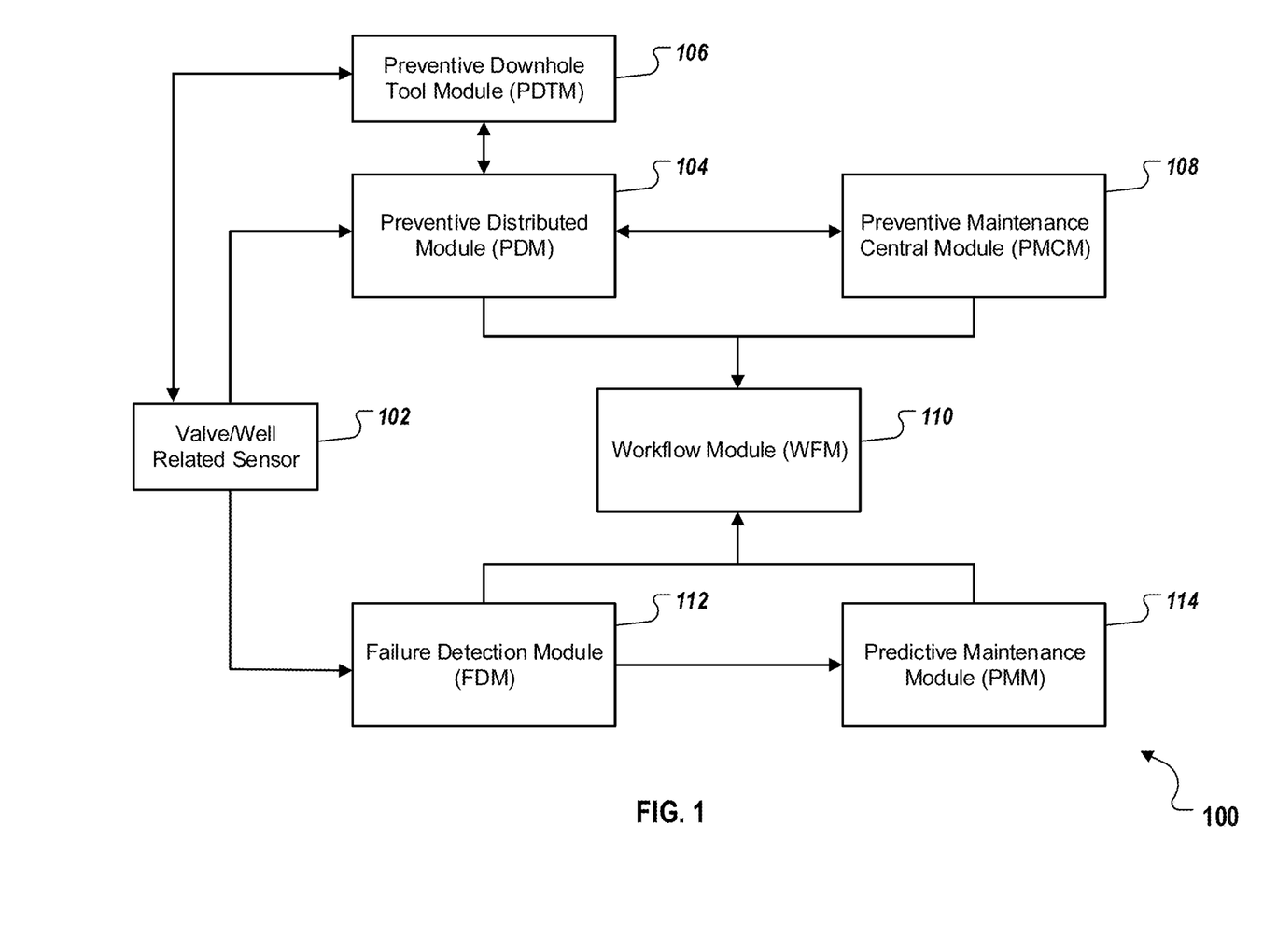
FIG. 1 is a block diagram of an example of an automated preventive and predictive maintenance to downhole valves (APPMDV) system, according to an implementation.

FIG. 1 is a block diagram of an example of an APPMDV system 100, according to an implementation. The APPMDV system 100 has sensors 102 disposed in downhole valves and wellbores. The sensors 102 are connected to a preventive distributed module (PDM) 104, a preventive downhole tool module (PDTM) 106, and a failure detection module (FDM) 112. The APPMDV system 100 also includes a preventive maintenance central module (PMCM) 108 and a predictive maintenance module (MAI) 114, together with the PDM 104 and the FDM 112, providing information to a workflow module (WFM) 110 that defines maintenance schedules and generates maintenance reports and alerts for manual intervention. As will be understood by those of ordinary skill in the art, each module of the PDM 104, PDTM 106, PMCM 108, WFM 110, FDM 112, and PMM 114 can be implemented as computer instructions stored on a computer-readable media and executable by computer systems to perform corresponding operations. Different modules can be connected to each other, can send instructions to each other, and can share data, and that these connections allow the different modules to function collectively to schedule and perform valve maintenances.

In some implementations, the downhole valve can be a choke valve which controls the well fluid flow at a designed flow rate. The fluid flow rate through a choke valve can be determined by an opening size of the valve, a diameter of a flow path in which the valve is disposed, an upstream fluid pressure and an upstream fluid temperature on the input path of the valve. In some implementations; the downhole valve can be a control valve, where the flow rate can be proportional to a square root of a pressure drop between an upstream fluid pressure and a downstream fluid pressure on the output path of the valve.

The sensors 102 can be disposed at multiple locations in the wellbore, for example, disposed at each downhole valve, measuring the valve condition and wellbore condition. The APPMDV system can form diagnostic data based on sensor measurements. The diagnostic data can include, for example, valve attribute data, well production attribute data, fault detection attribute data, other diagnostic data, or combinations of them. The valve attribute data can include, for example, a valve position, line pressure, fluid temperature, flow rate of the fluid flow through the valve, other diagnostic data, or combinations of them. The valve position can indicate a valve opening size, for example, an open, partially open, or closed position. The line pressure can indicate a fluid pressure in the flow path controlled by the valve. For example, the sensors 102 can measure the upstream and downstream fluid pressure. The sensors 102 can also measure the upstream and downstream fluid temperature.

The well production attribute data can include, for example, a well head pressure, a well fluid production rate, other diagnostic data, or combinations of them. The well head pressure can indicate a pressure at a surface of the wellbore. The well fluid production rate can indicate a flow rate of the well fluid through the wellbore. The fault detection attribute data can indicate, for example; a leakage in the valve actuator, looseness in the valve assembly and connections, pressure restrictions, friction diagnostics, pressure or temperature deviations. The fault detection attribution data can also indicate, for example, a hydraulic failure, scale build up, seat tightness, erosion or corrosion in the valve, and other faults. As will be understood by those of ordinary skill in the art, the sensors 102 can also measure other electrical or mechanical parameters related to the valve and wellbore. The sensors 102 can connect to the PDM 104, PDTM 106, and FDM 112 through wireline or wireless connections. For example, wireless radio signals can be used to provide communications between the sensors 102 and the PDM 104, PDTM 106, and FDM 112.

The PMCM 108 can have a library including information of all downhole valves. The PMCM 108 can be used to configure attributes for each valve, such as the valve position, valve opening size in inches, or valve opening size in percent. Multiple valves can be configured concurrently or sequentially. In some implementations, the APPMDV system 100 can include information of all valves that belong to different oil and gas companies. The PMCM 108 can store information in a hierarchical structure, for example, a company level, followed by a field level if each company has multiple reservoir fields, and followed by a well level if each field has multiple wells. The PMCM 108 can provide a front end user interface to an operator for executing, analyzing, or reporting valve maintenance. The PMCM 108 can also interface with other modules or applications in an enterprise system that includes the APPMDV system or that the APPMDV system connects to, for providing or receiving information related to valve maintenance. The PMCM 108 can send valve information to the WFM 110 so that the WFM 110 can schedule maintenance for each valve.

The PDM 104 can have similar functions as the PMCM 108 but at a well level or field level. For example, the PDM 104 can have information of all downhole valves within a same well or field. In other words, multiple PDMs can be implemented in the APPMDV system 100, each PDM corresponding to a well or a field. The PDM 104 can have access to the library in the PMCM 108 and a capability to interface with other modules or applications in an enterprise system that includes the APPMDV system or that the APPMDV system connects to. The PDM 104 can be logically and physically placed at a well site. In some implementations, the PDM 104 and PMCM 108 can be connected by a local area network or a wide area network.

The PDM 104 can receive diagnostic data from the sensors 102. In some implementations, the PDM 104 can receive measurements from the sensors 102 and determine diagnostic data based on the received measurements. To minimize sticking of moving parts of a valve due to setting at the same valve position for a long period of time, during a normal valve maintenance, each valve can be moved sequentially to different valve positions, and the sensors 102 can measure diagnostic data at different valve positions. After cycling through the different positions, the valve can be returned to its original position. The PDM 104 can link the valve attribute data at different valve positions to the corresponding well production attribute data.

The PDM 104 can also compare the diagnostic data at different valve positions by a correlation operation, and determine if the condition at the valve is normal or abnormal. For example, a valve is initially at an open position when the PDM 104 collects first diagnostic data. During maintenance, the PDM 104 moves the valve to a half-open position when second diagnostic data is collected, and then moves the valve to a closed position when third diagnostic data is collected. For each position, the PDM 104 can examine the corresponding diagnostic data to determine if the valve is operated as expected. For example, the PDM 104 can determine if the measured flow rate is similar to an expected flow rate calculated based on the valve opening size, measured fluid pressure and temperature. If the difference between the measured and expected flow rate is more than a predetermined threshold, the valve can have an abnormal condition and may need to be repaired, replaced, or other maintenance operations can be performed. In some implementations, the PDM 104 can compare the three diagnostic data, and, for example, determine if the fluid pressure change due to the valve opening size change correlates to or matches the corresponding flow rate change. Based on the diagnostic analysis, the PDM 104 can schedule a maintenance operation such as a valve repair or replacement and send the schedule to the WFM 110.

In some implementations, the PDM 104 can also implement a time based automated preventive maintenance, for example, an automated quarterly preventive maintenance that strokes valves quarterly to prevent sticking of moving parts of a valve due to the long period of setting at the same position. The valve can be moved to different positions during the automated preventive maintenance.

Figure 2:
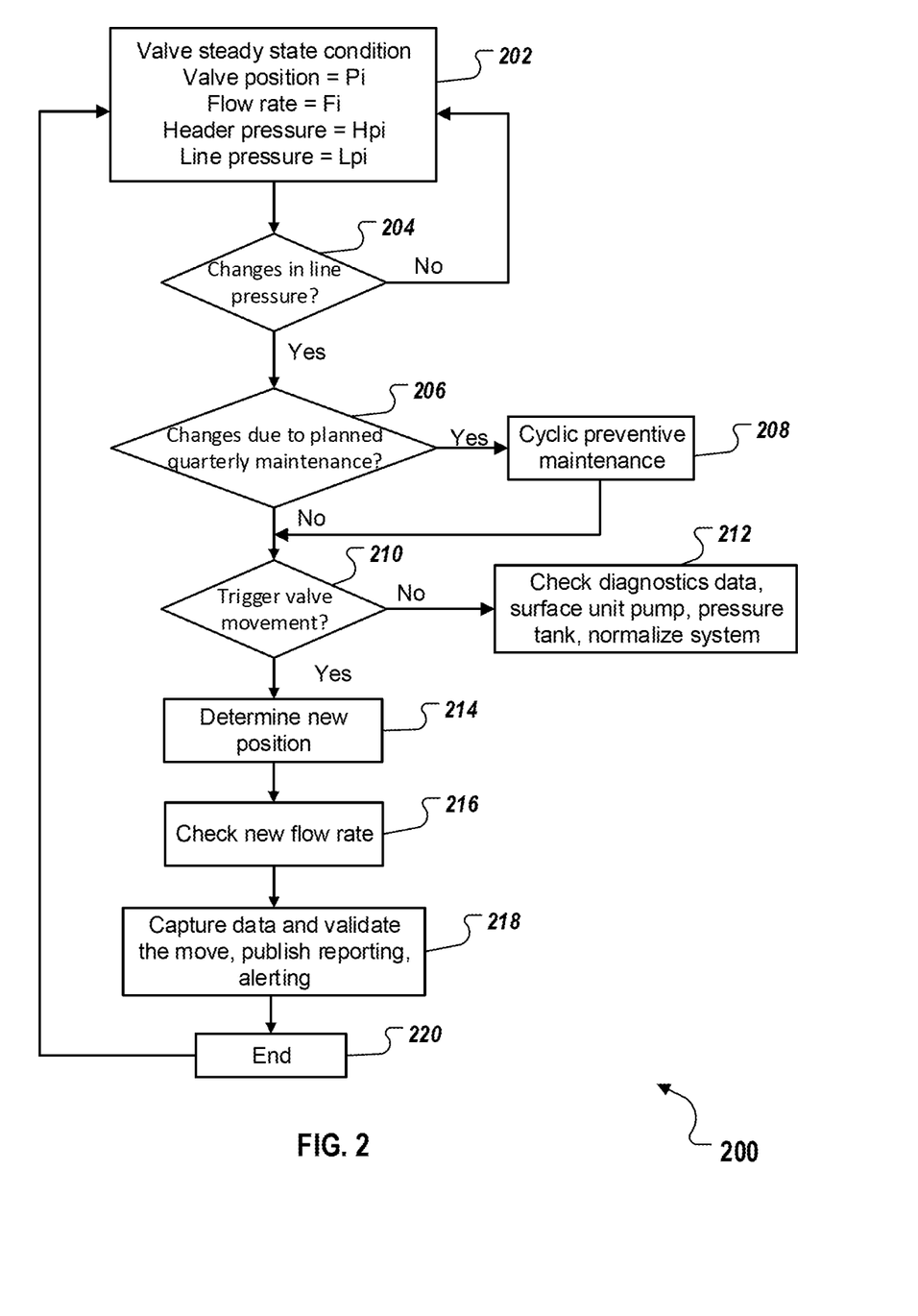
FIG. 2 is a flowchart of an example method implemented in a preventive distributed module (PDM) for valve maintenance, according to an implementation.

FIG. 2 is a flowchart of an example method 200 implemented in a PDM for valve maintenance, according to an implementation. For clarity of presentation, the description that follows generally describes method 200 in the context of the other figures in this disclosure. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, a valve is at an initial valve position with a steady state valve flow rate, well head pressure, and valve line pressure (that is, fluid pressure). In some implementations, the PDM 104 can store the diagnostic data corresponding to the initial valve position. From 202, method 200 proceeds to 204.

At 204, the PDM 104 determines whether there is a change in the line pressure. In some implementations, the valve sensor can periodically or non-periodically measure the line pressure and send the measurements to the PDM 104 so that the PDM 104 can determine if there is a change in the line pressure. If it is determined that there is no change in the line pressure, the method 200 returns to 202 and continues to stay at the initial valve position. Otherwise, if it is determined that there is a change in the line pressure, the method 200 proceeds to 206.

At 206, the PDM 104 determines whether the line pressure change detected at 204 is a planned change, for example, due to a planned quarterly maintenance. The planned quarterly maintenance can be a time based automated preventive maintenance that strokes valves quarterly to prevent sticking of moving parts of a valve due to the long period of setting at the same position. If it is determined that the line pressure change is due to the scheduled quarterly maintenance, the method 200 proceeds to 208 to perform the scheduled maintenance and then proceeds to 210. Otherwise, the method 200 directly proceeds to 210.

At 210, the PDM 104 determines whether a valve movement needs to be triggered to capture diagnostic data. If it is determined that no valve movement is scheduled, the method 200 proceeds to 212 to perform operations such as check diagnostic data, surface unit pump, and pressure tank. Otherwise, if it is determined that a valve movement is scheduled to capture diagnostic data, the method 200 proceeds to 214. In some implementations, the valve movement can be pre-scheduled based on a calendar, for example, once every three months or other maintenance cycle duration.

Alternatively, or in addition, the valve movement can be implemented in response to an operator input.

At 214, the PDM 104 determines a new valve position. In some implementations, the different valve positions that the valve will sequentially move to for capturing diagnostic data can be predetermined by, for example, the PMCM 108 or other modules in the APPMDV system. From 214, the method 200 proceeds to 216.

At 216, the PDM determines the fluid flow rate at the new valve position. For example, the PDM can receive measured flow rate from the valve sensor. In some implementations, the PDM can receive diagnostic data at the new valve position from the sensor and store the received diagnostic data. From 216, the method 200 proceeds to 218.

At 218, the PDM can compare the diagnostic data at the new valve position and the diagnostic data at the initial valve position, and determine if the valve has an abnormal condition. If there is an abnormal condition, a report or an alert can be provided on a user interface to an operator. In some implementations, the PDM can validate the valve movement based on the diagnostic data. For example, the valve is initially closed, and the new position is an open position. If, as expected, the flow rate at the open position is larger than the flow rate at the closed position, the movement to the open position can be a valid valve movement. From 218, the method 200 ends at 220. In some implementations, 214 to 218 can be repeated for all valve positions that the valve needs to cycle through. In some implementations, from 220, the method 200 can return to 202 and repeat 202 to 218 for a next valve.

Following is one example of pseudo code for the operation performed at PDM:

```
Let Choke Valve n = CVn;       where n=1, 2, 3...
Let Choke Valve Position = Pi;  where i=1, 2, 3,
    For CVn, find attributes:
        Date: HH:MM, Day, Month, Year
        Flow Rate=Fri
        Header Pressure Hpi
        Line Pressure=LPi
    Report Attributes
    Set CVn position to position i+1
    Report Attributes
Report Attributes
    Set CVn Position to position i
    Report Attributes
    Function= Compare
        CVn Pi
        Header Pressure Hpi
        Line Pressure=LPi
    Function=Validate
        Pi;Hpi, Lpi to Pi+1, Hpi+1 , LPi+1
        if Hpi<Hpi+1, and LPi<LPi+1 then Pi+1 is reported.
        else check Fri
        if Fri < Fri+1
        then report Pi+1
    Continue
```

In the above pseudo code, the valve is sequentially moved to multiple valve positions, and the PDM validates the valve movement based on the measured diagnostic data.

Turning back to FIG. 1, the APPMDV system 100 can also include a PDTM 106 connecting to the downhole sensors and valves. The PDTM 106 can interface to the PDM 104 and instruct downhole sensors and valves to execute tasks defined by the PDM (for example, priority based scheduling execution defined by the PDM), address priorities in task executions, address schedule events and unscheduled events. In some implementations, the PDTM 106 can execute tasks defined by the PMCM 108, for example, priority based scheduling execution defined by the PMCM. In addition, the PDTM 106 addresses historical tracking for a particular well, provides trends on diagnostic data, and addresses planning for valve attributes.

The PMM 114 can forecast valve health and determine potential valve failures over time based on a library of complex physical valve models developed under different stress conditions as well as a library of valve life estimation models. The physical valve models and life estimation models can consider effects of a multi-phase flow, pressure and temperature, flow velocity, h2s, crude oil type as well as minimum constraints mandated by industry standards for an instrumented equipment.

In some implementations, the PMM 114 can forecast the valve heath based on degradation of the valve. In some implementations, diagnostic data of a valve can be periodically captured based on a pre-determined maintenance cycle (for example, every three months or other maintenance cycle duration). By comparing diagnostic data from a current cycle and a previous cycle, the degradation of the valve can be estimated. For example, on January $1^{st}$, the valve is moved from an open position to a closed position and back to the open position, and diagnostic data corresponding to the open and closed position are captured. On April $1^{st}$, the valve repeats the same operation as it did three months ago, that is, moving from an open position to a closed position and back to the open position, and capturing diagnostic data corresponding to the open and closed position. The PMM 114 can compare the diagnostic data at the open position on January $1^{st}$ and April $1^{st}$ to see if there are significant changes. For example, if the flow rate at the open position on April $1^{st}$ is lower than that on January $1^{st}$ more than a predetermined threshold, it can be an indication that the valve is beginning to wear. Similarly, the PMM 114 can compare the diagnostic data at the closed position on January $1^{st}$ and April $1^{st}$ to see if there are significant changes.

In some implementations, an output of the valve life estimation model can be a reliability of the valve indicating a probability that the valve will not fail before a certain duration of time. In other words, the reliability indicates a probability that the remaining lifetime of the valve is more than a certain duration of time. For example, assuming that x is defined as a remaining lifetime of a valve, the probability the remaining lifetime of the valve more than a time duration t, can be expressed as Probability(x>t). A high reliability indicates that the valve is in a good condition and a low reliability indicates that the valve is beginning to wear. Typically, diagnostic data may need to be captured more frequently to avoid a valve failure if the valve is beginning to wear. For example, if normal maintenance occurs every three months, the PMM 114 can determine the reliability of Probability(x>3 months). If this reliability is high, say, 90%, the 3-month normal maintenance cycle for capturing diagnostic data can be sufficient for the valve. In some cases, if the valve is in good condition, a maintenance cycle duration longer than the normal cycle duration can be used to reduce maintenance cost. However, if the reliability is low, say, 10%, an increased frequency of capturing diagnostic data, for example, once every month, may be needed. The PMM 114 can send the reliability to the WFM 110 so that the WFM 110 can dynamically schedule maintenance for each valve based on individual health condition.

In some implementations, the PMM can also forecast the valve health by correlating conditions of multiple valves. For example, if a valve is similar to twenty other valves and the twenty other valves were found to be defective, more than likely, that valve will also be affected and an increased frequency of capturing diagnostic data may be needed so that a defect can be detected early.

The FDM 112 can connect to the downhole sensors 102 and detect faults and abnormal conditions. Abnormal conditions can be abnormal hydraulic condition, valve condition, position condition, wellbore conditions and the well performance condition. For example, an abrupt change in pressure or temperature on a downstream of the valve can be detected. Faults can range from leaks, plugs, sheared parts, loose connections, vibrations or others. Early detections of faults and abnormal conditions allow for time to repair valves without unplanned shutdowns. The FDM 112 can monitor indices that represent performance of the valve components, for example, an actuator status and a positioner status that can monitor actuator data and various aspects of the valve assembly. After a fault or an abnormal condition has been detected, the FDM 112 can send the information of the fault or abnormal condition to the PMM 114. The PMM 114 can evaluate impact and severity of the detected fault and abnormal condition and provide the evaluation to the WFM 110. The WFM 110 can dynamically schedule maintenance based on the detected faults and abnormal conditions.

The WFM 110 is responsible for scheduling preventive and predictive maintenance based on the received information from the PDM 104, PMCM 108, FDM 112, and PMM 114. For example, the WFM 110 can define the schedule of capturing diagnostic data and performing diagnostic analysis to enable preventive and predictive maintenance. The WFM 110 can also generates reports, actions, and alerts for manual intervention, for example, on a user interface to an operator.

In some implementations, the PDM 104, PDTM 106, and FDM 112 can be implemented at a well site, and the PMCM 108, WFM 110, and PMM 114 can be implemented at a location away from the well and in a centralized office.

Figure 3:
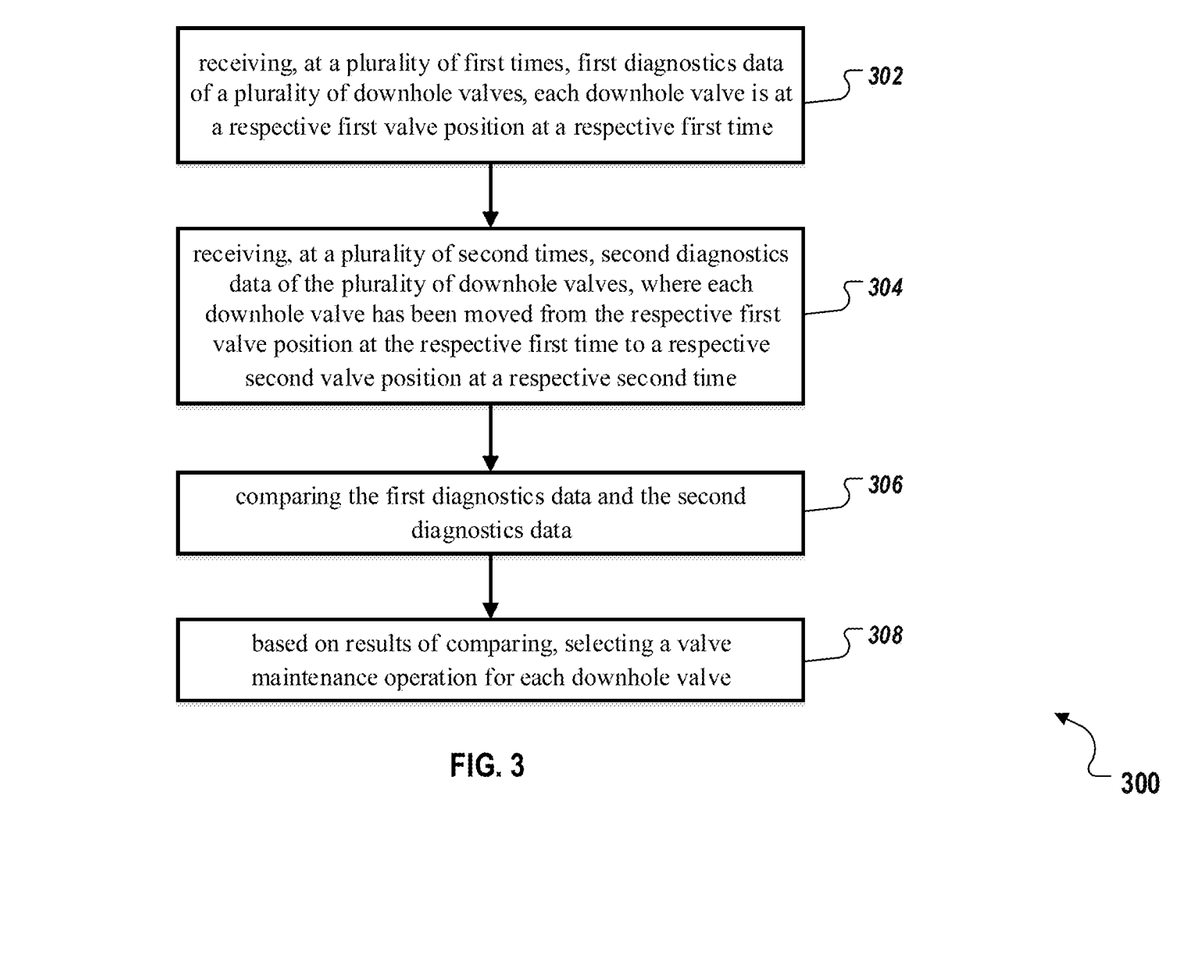
FIG. 3 is a flowchart of an example method for automated preventive and predictive maintenance for downhole valves, according to an implementation.

FIG. 3 is a flowchart of an example method 300 for automated preventive and predictive maintenance for downhole valves, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At 302, first diagnostics data of a plurality of downhole valves is received at a plurality of first times, where each downhole valve is at a first valve position at a first time. Sensors can be disposed in each valve and the wellbore to measure the valve condition and well condition. The APPMDV system can capture diagnostics data corresponding to the first valve position based on information measured by the sensors. The diagnostic data can include, for example, valve attribute data, well production attribute data, and valve fault detection attribute data, other diagnostic data or combinations of them. From 302, method 300 proceeds to 304.

At 304, second diagnostics data of the plurality of downhole valves is received at a plurality of second times, where each downhole valve has been moved from the first valve position, at the first time to a second valve position, at a second time. The APPMDV system can capture diagnostic data corresponding to the second valve position. For example, the APPMDV system can move the valve from the first position of an open position to the second position of a closed position. In some implementations, the valve can be moved to a third position at a third time, a fourth position at a fourth time, and so on. After the valve has cycled through all positions, the valve is returned to its first position. From 304, method 300 proceeds to 306.

At 306, the first diagnostics data and the second diagnostics data are compared. In some implementations, the APPMDV system can perform a correlation operation on the first and the second diagnostics data. For example, if the valve is moved from an open position to a closed position, the fluid pressure change can be correlated to the fluid flow rate change by checking if the measured flow rate change is similar to an expected flow rate change based on the fluid pressure change. If the measured flow rate change is significantly different from the expect flow rate change, for example, by an amount more than a predetermined threshold, the APPMDV system can determine that there is a valve abnormal condition. From 306, method 300 proceeds to 308.

At 308, based on results of the comparing at 306, a valve maintenance operation is selected for each downhole valve. For example, if the valve is determined to have an abnormal condition at 306, the APPMDV system can schedule or perform, or both, a valve maintenance operation such as a valve repair, valve replacement, or other maintenance operations.

Figure 4:
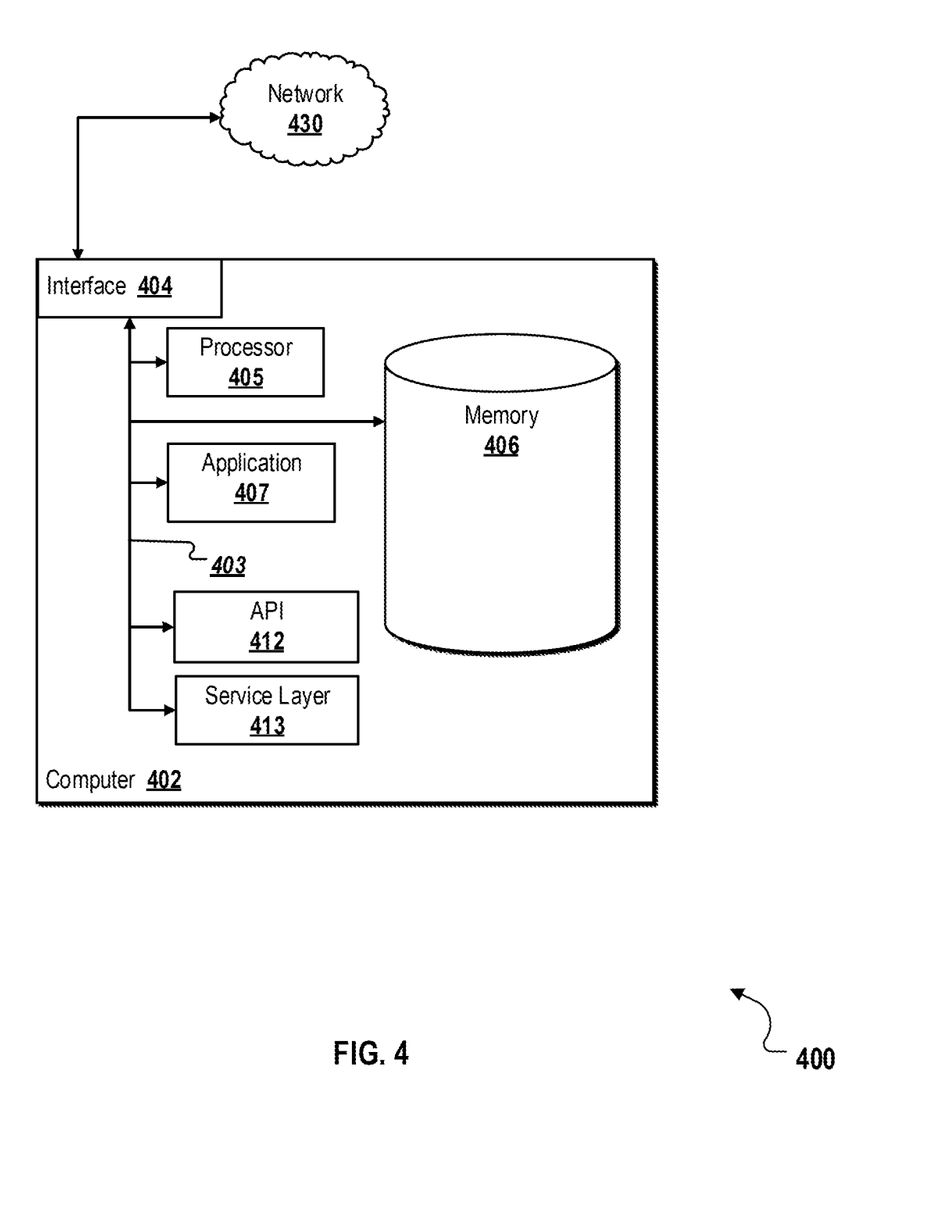
FIG. 4 is a block diagram of an exemplary computer system used to provide computational functionalities associated with described algorithms, methods, functions, processes, flows, and procedures as described in the instant disclosure, according to an implementation.

FIG. 4 is a block diagram of an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a GUI.

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and respond to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403, using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment, that are connected to the network 430 (whether illustrated or not). Generally, the interface 404 comprises logic encoded in software or hardware (or a combination of software and hardware) and operable to communicate with the network 430. More specifically, the interface 404 may comprise software, supporting one or more communication protocols associated with communications, such that the network 430, or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Implementations of the subject matter and the functional operations described in this disclosure can be implemented in digital electronic circuitry, in tangibly embodied computer software or firmware, in computer hardware, including the structures disclosed in this disclosure and their structural equivalents, or in combinations of one or more of them. Implementations of the subject matter described in this disclosure can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, UNIX, WINDOWS, MAC OS, ANDROID, MS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this disclosure can be performed by one or more programmable computers, executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches; classes, frameworks; applications, backup data, jobs; web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example; a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example; visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural, to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example; a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example; 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

Thus, particular implementations of the subject matter have been described. Other implementations are within the scope of the following claims.

The invention claimed is:

1. A computer-implemented method in a well system comprising a plurality of downhole valves, each downhole valve positioned below a surface and in a wellbore included in the well system, each downhole valve controlling flow of well fluid through the wellbore:

detecting a change in a valve line pressure of a first downhole value of the plurality of downhole valves;

determining, in response to detecting the change in the valve line pressure, whether the change is due to a planned maintenance;

performing, in response to determining that the change is not due to a planned maintenance, a diagnostic test on the first downhole valve, the diagnostic test comprising:

receiving, at a first time and by one or more processors, first diagnostics data of the first downhole valve of the plurality of downhole valves, wherein the first diagnostics data represents: (i) a first valve condition of the downhole valve at a first valve position and at the first time, and (ii) a first well head pressure at the surface of the well system for the first downhole valve at the first valve position and at the first time;

causing the first downhole valve to move from the first valve position to a second valve position;

receiving, at a second time and by the one or more processors, second diagnostics data of the first downhole valve, wherein the second diagnostics data represents: (i) a second valve condition of the downhole valve at the second valve position and at the second time, and (ii) second well head pressure at the surface of the well system for the first downhole valve at the second valve position and at the second time;

comparing, by the one or more processors, the first diagnostics data and the second diagnostics data; and based on results of comparing the first diagnostics data and the second diagnostics data, selecting, by the one or more processors, a valve maintenance operation for the first downhole valve.

2. The computer-implemented method of claim 1, further comprising:

after collecting the second diagnostics data of the first downhole valve at the second valve position, returning the first downhole valve to the first valve position.

3. The computer-implemented method of claim 1, further comprising:

receiving, at a third time and by the one or more processors, third diagnostics data of the first downhole valve, wherein the first downhole valve is at the first valve position at the third time, and the third diagnostics data represents a third valve condition of the first downhole valve at the first valve position and at the third time;

causing the first downhole valve to move from the first valve position to the second valve position;

receiving, at a fourth time and by the one or more processors, fourth diagnostics data of the first downhole valve, wherein the fourth diagnostics data represents a fourth valve condition of the first downhole valve at the second valve position and at the fourth time;

comparing, by the one or more processors, the first diagnostics data and the third diagnostics data;

comparing, by the one or more processors, the second diagnostics data and the fourth diagnostics data; and based on results of comparing the first diagnostics data and the third diagnostics data and comparing the second diagnostics data and the fourth diagnostics data, scheduling, by the one or more processors, a second valve maintenance operation for the first valve at a future time.

4. The computer-implemented method of claim 3, further comprising:

determining a reliability for the first downhole valve based on the results of comparing the first diagnostics data and the third diagnostics data and comparing the second diagnostics data and the fourth diagnostics data, wherein the reliability indicates a probability that the first downhole valve would fail during a predetermined duration of time; and determining the respective future time for the second valve maintenance operation for the first downhole valve based on the reliability.

5. The computer-implemented method of claim 3, wherein for the first downhole valve the third time is three months from the first time, and the fourth time is three months from the second time.

6. The computer-implemented method of claim 1, wherein the plurality of downhole valves are choke valves.

7. The computer-implemented method of claim 1, wherein the first and second diagnostics data further includes at least one of:

valve attribute data including at least one of valve position, line pressure, or a fluid flow rate through the first downhole valve, the valve position including at least one of an open or a closed position, and the line pressure including a well fluid pressure in a flow path controlled by the first downhole valve;

well production attribute data including well fluid production rate through the wellbore; or fault detection attribute data indicating at least one of leakage in a valve actuator, looseness in a valve assembly, or a hydraulic failure in the first downhole valve.

8. The computer-implemented method of claim 1, wherein comparing the first diagnostics data to the second diagnostics data comprises performing a correlation operation on the first diagnostics data and the second diagnostics data.

9. The computer-implemented method of claim 1, wherein the valve maintenance operation is at least one of replacing the first downhole valve, stopping flow of well fluid through the first downhole valve, repairing the first downhole valve, or capturing the diagnostic data.

10. The computer-implemented method of claim 1, further comprising:

for the first downhole valve, storing the first valve position, the first time, the second valve position, and the second time; and providing an alert based on the results of comparing the first diagnostics data and the second diagnostics data.

11. The computer-implemented method of claim 1, wherein the well system is a multilateral well comprising a mother wellbore and multiple lateral wellbores, the mother wellbore and each lateral wellbore comprising at least one of the plurality of downhole valves.

12. The computer-implemented method of claim 1, further comprising:

based on results of comparing the first diagnostics data and the second diagnostics data, adjusting, by the one or more processors, a frequency of capturing diagnostic data.

13. A non-transitory, computer-readable medium storing one or more instructions executable by a computer system to perform operations in a well system comprising a plurality of downhole valves, each downhole valve positioned below a surface and in a wellbore included in the well system, each downhole valve controlling flow of well fluid through the wellbore, the operations comprising:

detecting a change in a valve line pressure of a first downhole value of the plurality of downhole valves;

determining, in response to detecting the change in the valve line pressure, whether the change is due to a planned maintenance;

performing, in response to determining that the change is not due to a planned maintenance, a diagnostic test on the first downhole valve, the diagnostic test comprising:

receiving, at a first time and by one or more processors, first diagnostics data of the first downhole valve of the plurality of downhole valves, wherein the first diagnostics data represents: (i) a first valve condition of the downhole valve at a first valve position and at the first time, and (ii) a first well head pressure at the surface of the well system for the first downhole valve at the first valve position and at the first time;

causing the first downhole valve to move from the first valve position to a second valve position;

receiving, at a second time and by the one or more processors, second diagnostics data of the first downhole valve, wherein the second diagnostics data represents: (i) a second valve condition of the first downhole valve at the second valve position and at the second time, and (ii) second well head pressures at the surface of the well system for the first downhole valve at the second valve position and at the second time;

comparing the first diagnostics data and the second diagnostics data; and based on results of comparing the first diagnostics data and the second diagnostics data, selecting a valve maintenance operation for the first downhole valve.

14. The non-transitory, computer-readable medium of claim 13, the operations further comprising:

causing the first downhole valve to move from the second valve position to the first valve position;

receiving, at a third time and by the one or more processors, third diagnostics data of the first downhole valve, wherein the first downhole valve is at the first valve position at a third time, and the third diagnostics data represents a third valve condition of the first downhole valve at the first valve position and at the third time;

causing the first downhole valve to move from the first valve position to the second valve position;

receiving, at a fourth time and by the one or more processors, fourth diagnostics data of the first downhole valve, wherein the fourth diagnostics data represents a fourth valve condition of the first downhole valve at the second valve position and at the fourth time;

comparing the first diagnostics data and the third diagnostics data;

comparing the second diagnostics data and the fourth diagnostics data; and based on results of comparing the first diagnostics data and the third diagnostics data and comparing the second diagnostics data and the fourth diagnostics data, scheduling a second valve maintenance operation for the first downhole valve at a future time.

15. The non-transitory, computer-readable medium of claim 14, the operations further comprising:

determining a reliability for the first downhole valve based on the results of comparing the first diagnostics data and the third diagnostics data and comparing the second diagnostics data and the fourth diagnostics data, wherein the reliability indicates a probability that the first downhole valve would fail during a predetermined duration of time; and determining the future time for the second valve maintenance operation for downhole valve based on the reliability.

16. The non-transitory, computer-readable medium of claim 13, wherein the first and second diagnostics data further includes at least one of:

valve attribute data including at least one of valve position, line pressure, or a fluid flow rate through the first downhole valve, the valve position including at least one of an on or off position, and the line pressure including a well fluid pressure in a flow path controlled by the first downhole valve;

well production attribute data including well fluid production rate through the wellbore; or fault detection attribute data indicating at least one of leakage in a valve actuator, looseness in a valve assembly or connection, or a hydraulic failure in the first downhole valve.

17. A system, comprising:

a computer memory; and a hardware processor interoperably coupled with the computer memory and configured to perform operations in a well system comprising a plurality of downhole valves, each downhole valve positioned below a surface and in a wellbore included in the well system, each downhole valve controlling flow of well fluid through the wellbore, the operations comprising:

detecting a change in a valve line pressure of a first downhole value of the plurality of downhole valves;

determining, in response to detecting the change in the valve line pressure, whether the change is due to a planned maintenance;

performing, in response to determining that the change is not due to a planned maintenance, a diagnostic test on the first downhole valve, the diagnostic test comprising:

receiving, at a first time and by one or more processors, first diagnostics data of the first downhole valve of the plurality of downhole valves, wherein the first diagnostics data represents: (i) a first valve condition of the first downhole valve at a first valve position and at the first time, and (ii) a first well head pressure at the surface of the well system for the first downhole valve at the first valve position and at the first time;

causing the first downhole valve to move from the first valve position to a second valve position;

receiving, at a second time and by the one or more processors, second diagnostics data of the first downhole valve, wherein the second diagnostics data represents: (i) a second valve condition of the first downhole valve at the second valve position and at the second time, and (ii) a second well head pressure at the surface of the well system for the first downhole valve at the second valve position and at the second time;

comparing the first diagnostics data and the second diagnostics data; and based on results of comparing the first diagnostics data and the second diagnostics data, selecting a valve maintenance operation for the first downhole valve.

18. The system of claim 17, wherein the operations further comprise:

causing the first downhole valve to move from the second valve position to the first valve position;

receiving, at a third time and by the one or more processors, third diagnostics data of the first downhole valve, wherein the first downhole valve is at the first valve position at a third time, and the third diagnostics data represents a third valve condition of the first downhole valve at the first valve position and at the third time;

causing the first downhole valve to move from the first valve position to the second valve position;

receiving, at a fourth time and by the one or more processors, fourth diagnostics data of the first downhole valve, wherein the fourth diagnostics data represents a fourth valve condition of the first downhole valve at the second valve position and at the fourth time;

comparing the first diagnostics data and the third diagnostics data;

comparing the second diagnostics data and the fourth diagnostics data; and based on results of comparing the first diagnostics data and the third diagnostics data and comparing the second diagnostics data and the fourth diagnostics data, scheduling a second valve maintenance operation for the first downhole valve at a future time.

19. The system of claim 18, the operations further comprising:

determining a reliability for the first downhole valve based on the results of comparing the first diagnostics data and the third diagnostics data and comparing the second diagnostics data and the fourth diagnostics data, wherein the reliability indicates a probability that the valve would fail during a predetermined duration of time; and determining the future time for the second valve maintenance operation for the first downhole valve based on the reliability.

20. The system of claim 17, wherein the system further comprises multiple sensors disposed at multiple locations in the wellbore, and wherein the first and second diagnostics data is determined based on information sensed by the multiple sensors.

21. The system of claim 17, wherein the first and second diagnostics data further includes at least one of:

valve attribute data including at least one of valve position, line pressure, or a fluid flow rate through the first downhole valve, the valve position including at least one of an open or a closed position, and the line pressure including a well fluid pressure in a flow path controlled by the first downhole valve;

well production attribute data including well fluid production rate through the wellbore; or fault detection attribute data indicating at least one of leakage in a valve actuator, looseness in a valve assembly, or a hydraulic failure in the first downhole valve.

* * * * *

UNITED STATES PATENT AND TRADEMARK OFFICE
CERTIFICATE OF CORRECTION

PATENT NO. : 10,590,752 B2
APPLICATION NO. : 15/181005
DATED : March 17, 2020
INVENTOR(S) : Al-Waleed Abdullah Al-Gouhi, Soloman M. Almadi and Obiomalotaoso Leonard Isichei It is certified that error appears in the above-identified patent and that said Letters Patent is hereby corrected as shown below:

In the Claims

Column 17, Line 48, Claim 1, delete "value" and insert -- valve --;

Column 19, Line 46, Claim 13, delete "value" and insert -- valve --;

Column 21, Line 11, Claim 17, delete "value" and insert -- valve --.

Signed and Sealed this
Twenty-sixth Day of May, 2020

Andrei Iancu
*Director of the United States Patent and Trademark Office*